United States Patent
Chan

(10) Patent No.: US 8,970,476 B2
(45) Date of Patent: Mar. 3, 2015

(54) MOTION CONTROLLED IMAGE CREATION AND/OR EDITING

(75) Inventor: Wing-Shun Chan, Hong Kong (CN)

(73) Assignee: Vtech Electronics Ltd., Tai Po, New Territory (HK)

( * ) Notice: Subject to any disclaimer, the term of this patent is extended or adjusted under 35 U.S.C. 154(b) by 145 days.

(21) Appl. No.: 13/369,446

(22) Filed: Feb. 9, 2012

(65) Prior Publication Data

US 2013/0207885 A1    Aug. 15, 2013

(51) Int. Cl.
*G06F 3/01* (2006.01)
*G06F 1/16* (2006.01)
*G06F 3/0481* (2013.01)
*G06F 3/0484* (2013.01)

(52) U.S. Cl.
CPC ............ *G06F 1/1694* (2013.01); *G06F 3/0481* (2013.01); *G06F 3/0484* (2013.01); *G06F 2200/1637* (2013.01)
USPC ........................................................ 345/156

(58) Field of Classification Search
CPC ............................................... G06F 2200/1637
USPC .......... 345/156–158, 179, 442, 474; 702/141; 446/146
See application file for complete search history.

(56) References Cited

U.S. PATENT DOCUMENTS

| | | | | |
|---|---|---|---|---|
| 5,666,499 | A * | 9/1997 | Baudel et al. | 715/808 |
| 2004/0239626 | A1* | 12/2004 | Noguera | 345/158 |
| 2008/0048980 | A1* | 2/2008 | Love et al. | 345/158 |
| 2009/0284532 | A1* | 11/2009 | Kerr et al. | 345/442 |
| 2013/0132903 | A1* | 5/2013 | Krishnaswamy | 715/825 |

OTHER PUBLICATIONS

Mobile device game "Labyrinth", developed by Codify AB, first released Aug. 27, 2008.*

* cited by examiner

*Primary Examiner* — Seokyun Moon
*Assistant Examiner* — Peijie Shen
(74) *Attorney, Agent, or Firm* — McAndrews, Held & Malloy, Ltd.

(57) ABSTRACT

Methods, apparatus, and computer readable medium for creating and/or editing images are disclosed. An electronic tablet device may include a display, touch sensor, a motion sensor, controller and speaker. The motion sensor may generate input signals indicative of a spatial movement of the electronic tablet device. The controller may receive the input signals and generate output signals that move a drawing tool across a canvas of the display based on the spatial movement of the electronic device. The output signals may further update the canvas to reflect an effect of moving the drawing tool across the canvas per the tilting movement.

16 Claims, 4 Drawing Sheets

MOTION CONTROLLED IMAGE CREATION AND/OR EDITING

FIELD OF THE INVENTION

The present invention relates to image creation and/or editing. More specifically, certain embodiments of the invention relate to a toy having image creation and/or editing capabilities.

BACKGROUND OF INVENTION

Graphics painting programs have existed for decades. For example, the Windows® operating system manufactured by Microsoft Corporation has included various incarnations of a painting program since version 1.0 of the operating system. Such painting programs typically provide various tools (e.g., pencils, brushes, erasers, etc.) that permit a user to manipulate a computer mouse in order to "paint" on a virtual canvas displayed on a screen of the computer system. Through such manipulations, the business user may create new digital images and/or edit existing digital images. For example, a business user may use a painting program to create images for web sites, business reports, memorandums, presentations, and other business related documents.

While painting programs may have practical business applications, children often enjoy playing with painting programs in order to create and/or edit images on a computer screen. Thus, to many children, a painting program is a fun toy. However, besides being a means for entertainment, a painting program may also provide a vehicle for children to explore and develop creative and artistic abilities.

SUMMARY OF INVENTION

Aspects of the present invention are directed to methods, systems, and apparatus, substantially as shown in and/or described in connection with at least one of the figures and as set forth more completely in the claims.

These and other advantages, aspects and novel features of the present invention, as well as details of illustrative aspects thereof, will be more fully understood from the following description and drawings.

DETAILED DESCRIPTION

Figure 1:
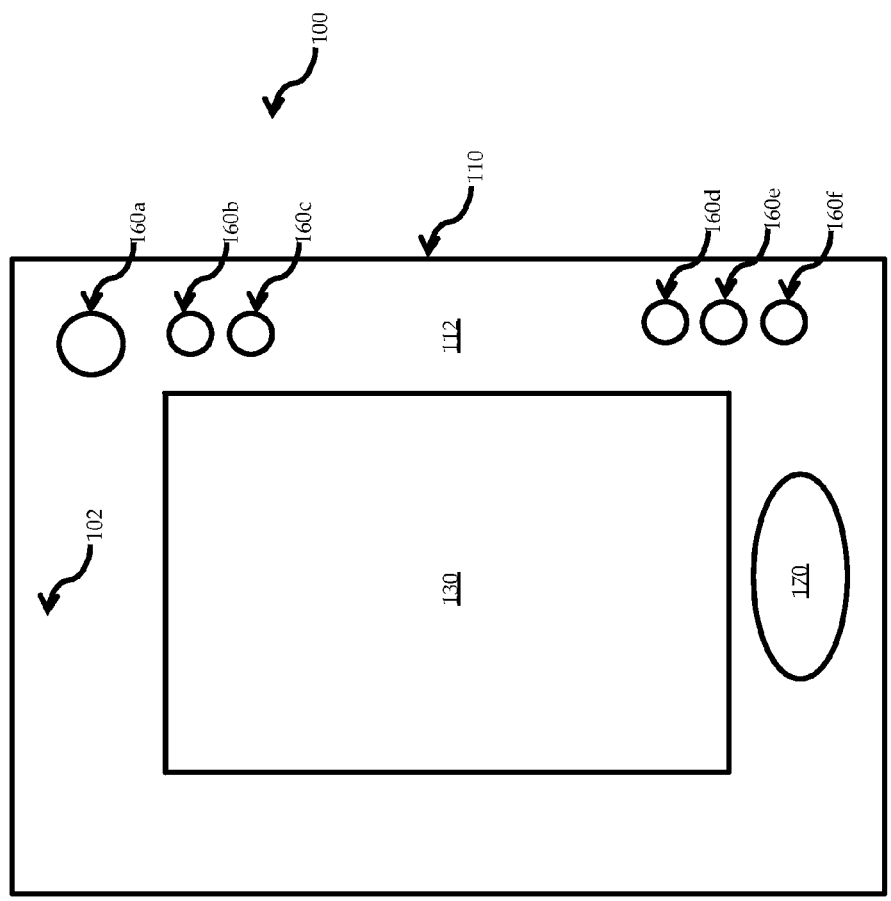
FIG. 1 is a diagram that illustrates a toy in the form of an electronic tablet device which may incorporate various aspect of the present invention.

Aspects of the invention may be found in a method, apparatus, and computer readable storage medium for creating and/or editing images via spatial movement (e.g., up, down, left, right, tilting, shaking, etc.) of the computing device itself. In some embodiments, an electronic tablet device may execute instructions of an image creation and/or editing program in order to permit a user to create and/or edit images via spatial movement of the electronic tablet device. In particular, the electronic tablet device may provide a canvas and one or more drawing tools to edit and/or create an image upon the canvas. The electronic tablet device may further include an accelerometer or other type of motion sensor in order to detect a spatial movement of the electronic tablet device. In response to such detected movement, the electronic tablet device may move a drawing tool across the canvas and update the image based on the movement of the drawing tool across the canvas. In this manner, the electronic table device may permit a user to create and/or edit an image by spatial movement of the electronic tablet device itself.

Figure 2:
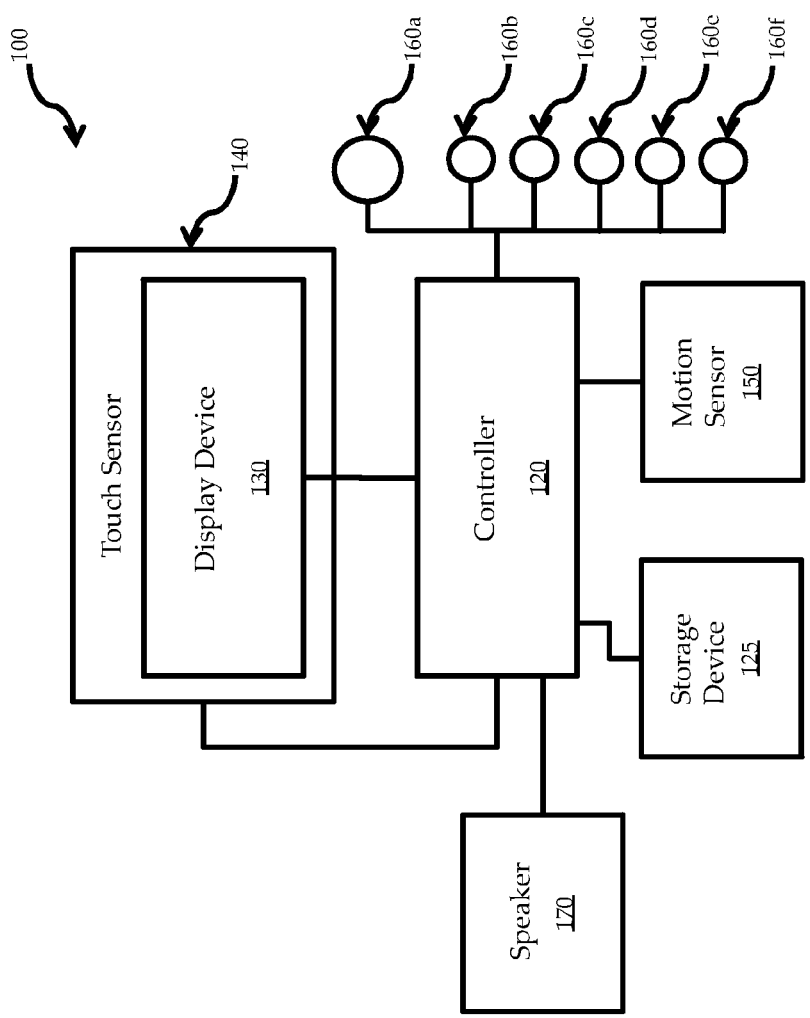
FIG. 2 is a simplified hardware diagram of the electronic tablet device of FIG. 1.

Referring now to FIGS. 1 and 2, an electronic tablet device 100 is shown which may incorporate various aspects of the present invention. While various aspects of the present invention are described in relation to a toy in the form of an electronic tablet device, it should be appreciated that various aspects of the present invention may be suited for other types computing devices, such as smart phones, personal digital assistants, audio players, handheld gaming devices, etc.

As shown, the tablet 100 may include a housing 110, a controller 120, a storage device 125, a display device 130, a touch sensor 140, a motion sensor 150, push buttons 160a-f, and a speaker 170. The housing 110 may include various rubber, plastic, metal, and/or other materials suitable for (i) encasing electrical components of the tablet 100, such as those depicted in FIG. 2, (ii) seating other components of the tablet 100 such as buttons 160a-f, and (iii) structurally integrating the various components of the tablet 100 to one another.

The controller 120 may include processing circuitry and control circuitry. In particular, the processing circuitry may include a central processing unit, a micro-processor, a micro-controller, a programmable gate array, and/or other processing circuitry capable of processing various input signals such as, for example, input signals from touch sensor 140, motion sensor 150, and push buttons 160a-f. The controller 120 may be further configured to generate various output signals such as, for example, video output signals for the display device 130 and audio output signals for the speaker 170.

The storage device 125 may include one or more computer readable storage media such as, for example, flash memory devices, hard disk devices, compact disc media, DVD media, EEPROMs, etc suitable for storing instructions and data. In some embodiments, the storage device 125 may store an image creation and editing program comprising instructions that, in response to being executed by the controller 120, provide a user of the tablet 100 with the ability to create and/or edit images stored in the storage device 125. In particular, such instructions when executed by the tablet 100 may enable the creation and/or editing of images via spatial movement (e.g., up, down, left, right, tilting, shaking, etc.) of the tablet 100 itself.

The display device 130 may present or display graphical and textual content in response to one or more signals received from the controller 120. To this end, the display device 130 may include an light-emitting diode (LED) display, an electroluminescent display (ELD), an electronic paper (E Ink) display, a plasma display panel (PDP), a liquid crystal display (LCD), a thin-film transistor display (TFT), an organic light-emitting diode display (OLED), or a display device using another type of display technology.

As shown, the display device 130 may span a considerable portion of a front surface or side 102 of the tablet 100 and may be surrounded by a bezel 112 of the housing 110. Thus, a user may hold the tablet 100 by the bezel 112 and still view content presented by the display device 130. Moreover, the housing 110 may further include a stand (not shown) that pops-out from a back surface of the tablet 100. The stand may permit the user to stand the tablet 100 on a table or another horizontal surface in order to view content presented by the display device 130.

The touch sensor 140 may overlay the display device 130 and provide the controller 120 with input signals indicative of location (e.g., a point, coordinate, area, region, etc.) at which a user has touched the screen 140 with a finger, stylus, and/or other object. Based upon touch input signals, the controller 120 may identify a position on the display device 130 corresponding to the touched location on the touch sensor 140. To this end, the touch sensor 140 may be implemented using various different touch sensor technologies such as, for example, resistive, surface acoustic wave, capacitive, infrared, optical imaging, dispersive signal, acoustic pulse recognition, etc. Moreover, in some embodiments, the tablet 100 may include a touch sensor in addition to or instead of the touch sensor 140 that does not overlay the display device 130. In such embodiments, the touch sensor may be a separate device that operably couples to the controller 120 of the tablet 100 via a wired or wireless connection.

As shown in FIG. 2, the tablet 100 may further include a motion sensor 150 configured to provide the controller 120 with input signals indicative of spatial movement (e.g., up, down, left, right, angle of tilt, shaking, etc.). To this end, the motion sensor 150 may include a multi-axis accelerometer capable of detecting magnitude and direction of acceleration as a vector quantity and to generate input signals for the controller 120 that are indicative of such detected vector quantity. Thus, the motion sensor 150 permits the controller 120 to detect spatial movement of the tablet 100 as a whole. For the sake of clarity, the motion sensor 150 contemplated by the present application and the appended claims detects movement of the tablet 100 as a whole instead of merely detecting movement of an input device (e.g., joystick, mouse, D-pad (direction pad), button, etc.) that may be actuated and manipulated in relation to the tablet 100. From the view point of the user, the tablet 100 itself becomes the input device as spatial movement of the tablet 100 (e.g., tilting forward) results in a corresponding input to the controller 120.

Besides the touch sensor 140 and motion sensor 150, the tablet 100 may further include push buttons 160*a*-6 in order to provide the controller 120 with additional input signals. Various embodiments of the tablet 100 may include additional and/or fewer additional input devices such as push buttons 160*a*-*f*, switches, sliders, etc. in order to provide the controller 120 with further input signals. However, it should be appreciated that many if not all of such push buttons 160*a*-*f* and/or other input devices may be eliminated. The functions performed by such eliminated input devices may be implemented by the touch sensor 140 and/or motions sensor 150 or may be simply removed from some embodiments.

The push buttons 160*a*-*f* may be seated in housing 110 and configured to provide controller 120 with an input signal in response to being activated. As such, push buttons 160*a*-*f* may provide a user of the tablet 100 with the ability to trigger certain functionality of the tablet 100 by merely actuating the respective button. For example, the push buttons 160*a*-*f* may include a power button 160*a*, a home button 160*b*, a help button 160*c*, a volume-up button 160*d*, and volume down button 160*e*, and a brightness button 160*f*. The power button 160*a* may toggle the tablet 100 between powered-on and powered-off states. The volume-up and volume-down buttons 160*d*, 160*e* may respectively cause the controller 120 to increase and decrease audio output signals to the speaker 170. The brightness button 160*f* may cause the controller 120 to adjust a brightness level of the display device 130. The home button 160*b* may request the controller 120 to present a home or default menu on the display device 130 and the help button 160*c* may request the controller 120 to present help information via the display device 130 and/or the speaker 170.

Figure 3:
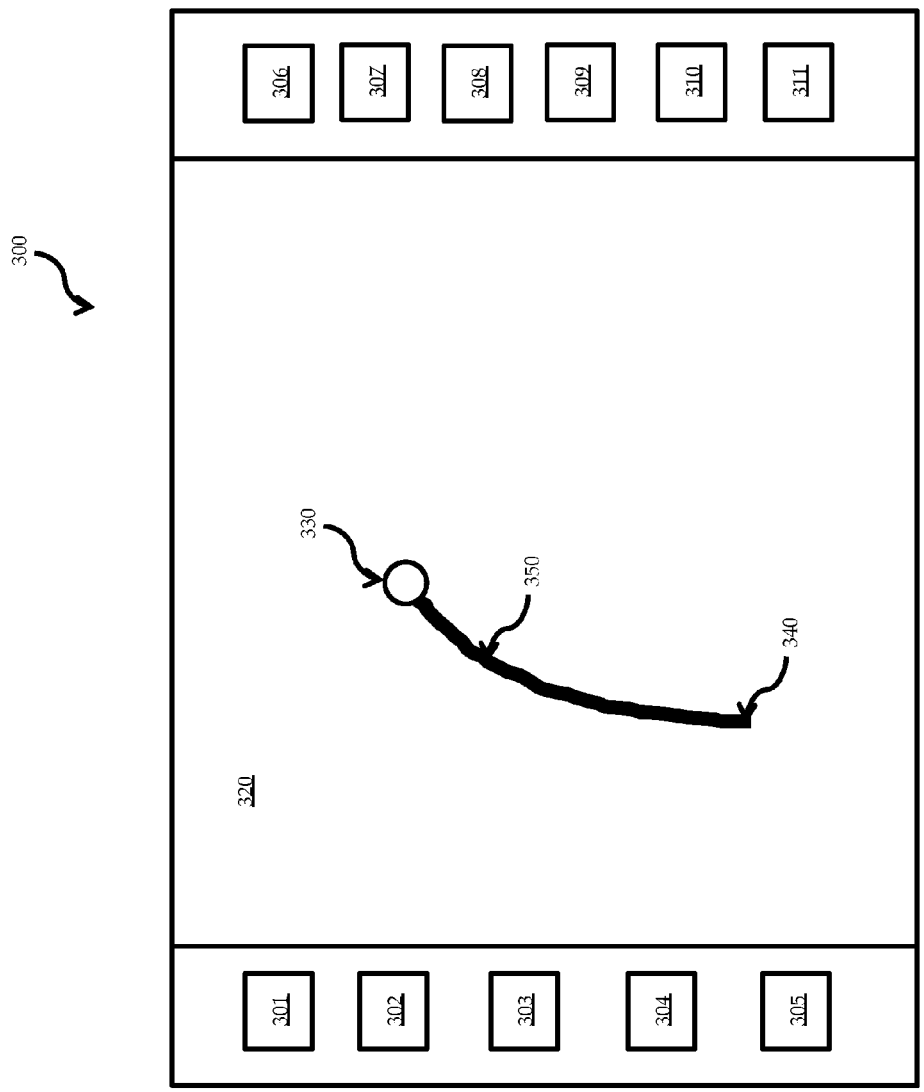
FIG. 3 shows aspects of an image creation and/or editing program for the electronic tablet device of FIG. 1.

Referring now to FIG. 3, a main screen 300 of an image creation and editing program as depicted on display device 130 is shown. In particular, the main screen 300 includes controls 301-311 and a canvas 320. The controls 301-311 provide a user with the ability to control various aspects of the image creation and editing program and the canvas 320 provides an area upon which to display, create, and/or edit an image. In one embodiment, the controls 301-311 are virtual buttons which a user may activate by touching the respective control via the touch sensor 140. In response to being activated, the controls 301-311 may pop-up a dialog window or slide out a drawer via which the user may make additional selections (e.g., color, file name, storage location, etc.) associated with the activated control 301-311.

In the interest of brevity, the specification and claims may generally refer to touching a control or other item depicted on the display device 130. However, it should be appreciated that the user's finger, stylus, or other object does not in fact touch the graphical representation of the control or item depicted on the display device 130. Instead, the finger, stylus, or other object may contact a protective coating, covering, or possibly the touch sensor 140 itself which is positioned over of the display device 130. The touch sensor 140, in response to such touching, may generate input signals indicative of a location (e.g., point, coordinate, area, region, etc.) associated with the touch on the touch sensor 140. The controller 120 may then determine based upon the input signals which displayed item the user was attempting to touch.

In one embodiment, the main screen 300 may include control buttons such as a new page button 301, a save button 302, a reset button 303, a undo button 304, and a music on/off button 305. A user may touch the new page button 301 to make a new creation or image. In particular, the program may permit the user to choose from one or more page templates or a photo stored in storage device 125. A user may touch the save button 302 to save the creation to the storage device 125, may touch the reset button 303 to reset the whole creation, and may touch the undo button 304 to undo the most recent change to the creation. The user may also touch the music on/off button 305 to toggle background music between on and off states.

The main screen 300 may further include drawing tool buttons for selecting a drawing tool for creating and editing an image on the canvas 320. For example, the main screen may include a brush button 306, a pencil button 307, a magic pen button 308, a sticker button 309, a fun tool button 310, and an eraser 311. A user may touch the brush button 306 to select different colored brushes for painting on the canvas 320. In particular, a user may paint using the selected brush by drag a finger, stylus, or other object over the canvas 320 in a manner similar to drawing on paper with a pencil. Similarly, a user may touch the pencil button 307 to select different colored pencils for painting on the canvas 320 and may touch the magic pen button 308 to select different fun color and patterned pens on the canvas 320. The user may also touch the sticker button 309 to select stickers which may be placed on the creation by touch, and may touch the erase button 311 to erase portions of the creation by touching the portions to be erased.

Finally, the user may touch the fun tool button 310 in order to select from various silly tools for modifying the creation. For example, a user may drag and drop a hopping frog or a car unto the canvas 320 which automatically move across the canvas leaving tracks behind as the move. Moreover, the user may drag and drop a ball 330 unto the canvas 320 which also leaves a track or path 350 on the canvas 320 as the ball 330 moves across the canvas 320. However, in one embodiment, the user may control and/or influence the path 350 over which the ball 330 travels by tilting the tablet 100. The controller 120 in regard to the fun tools, bushes, pencils and other tools may further generate audio signals for the speaker 170 which correspond to or audibly enhance the playful effect of using the selected tool on the canvas 320. For example, the controller 120 may generating audio signals for scribbling noises when using the pencil, frog noise for the hopping frog, and whimsical music for the rolling ball 330.

In response to the user placing the rolling ball 330 on the canvas 320, the controller 120 treats or physically models the canvas 320 as a tilting table top. In particular, if the tablet 100 is held such that the Earth's gravitational force is normal or nearly normal to the front surface 102 of the tablet 100, then the ball 330 remains stationary. However, if the user tilts the tablet 100 at an angle such that Earth's gravitational force is no longer normal or nearly normal to the front surface 102, the controller 120 detects such tilting based upon input signals received from the motion sensor 150 and generates output signals for the display device 130 that make the ball 330 appear to roll in the direction in which the user tilted the tablet 100. While the above describes movement in regard to Earth's gravitational force, it should be appreciated that the motion sensor 150 may be implemented using various technologies such as gyroscopes or ecompass technologies that do not measure nor rely upon gravitational force to detect movement.

As shown in FIG. 3, the controller 120 may update the creation or canvas 320 to reflect the path 350 over which the ball 330 has rolled. For example, if the ball 330 were placed at location 340 and the user tilts the tablet 100 forward and to the right, the ball 330 may move along path 350. Furthermore, the controller 120 may update the canvas 320 by marking the path 350 with a random color, a color selected by the user, and/or a whimsical pattern (e.g., a rainbow pattern). In this manner, the user may create and/or edit images via spatial movement of the tablet itself in addition to touching the touch sensor 140.

Figure 4:
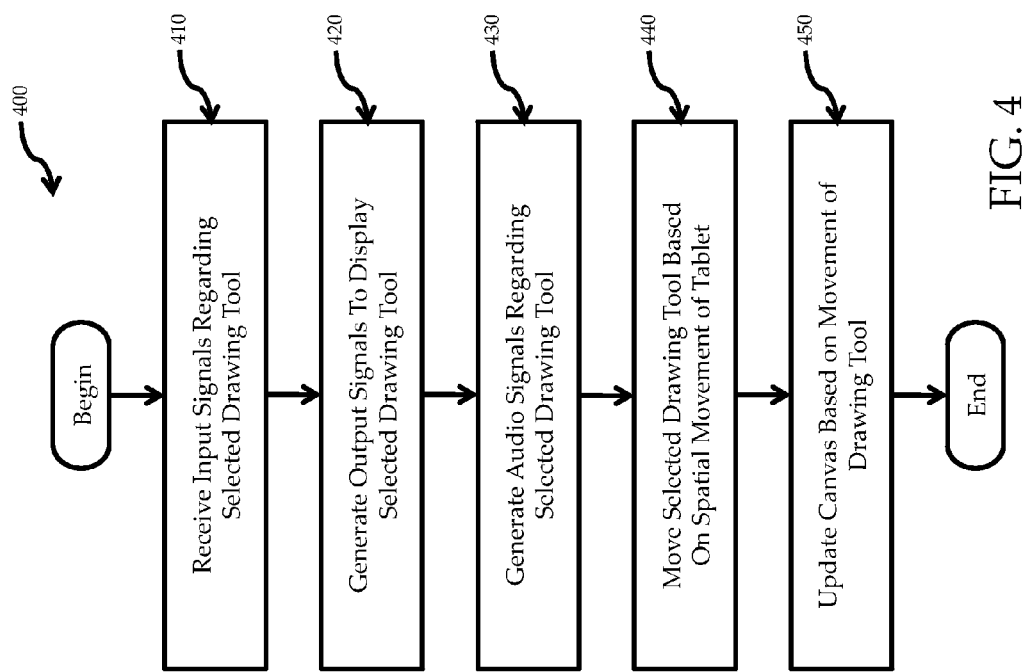
FIG. 4 shows a flowchart depicting aspects of the image creation and/or editing program of FIG. 3.

A method or process 400 for creating and/or editing an image using spatial movement of an electronic tablet device, such as tablet 100, is shown in FIG. 4. At block 410, the controller 120 may receive input signals from the touch sensor 140 that represent a selected drawing tool. The controller 120 at block 420 may generate output signals which cause the display device 130 to display the selected drawing tool over the canvas 320. For example, a user may touch the fun tool button 311, drag the rolling ball drawing tool 330 from a displayed drawer of drawing tools onto the canvas 320 at a location 340. In response to such user movements, the touch sensor 140 may generate input signals representative of the user selection and the dragging of the rolling ball drawing tool 330. In response to receiving such input signals, the controller 120 may select the rolling ball drawing tool 330 and generate output signals which cause the display device 130 to display the rolling ball drawing tool 330 at the location 340.

At block 430, the controller 120 may further generate audio signals which cause the speaker 170 to generate audible sounds corresponding to the selected drawing tool. For example, in one embodiment, the controller 120 may generate whimsical musical tones in response to the user selecting the rolling ball drawing tool 330.

The controller 120 at block 440 may determine appropriate movements for the selected drawing tool based on spatial movement of the tablet 100. For example, if the tablet 100 is tilted toward the left, then the controller 120 may determine to move the drawing tool toward the left. Likewise, if the tablet 100 is tilted toward the right, then the controller 120 may determine to move the drawing tool toward the right.

In one embodiment, the controller 120 may determine the appropriate movement for the drawing tool based upon a physics model for the drawing tool which may account for angular momentum, friction, pressure, and other modeled physical phenomena associated with the movement of real objects through space. For example, if the rolling ball drawing tool 330 is currently depicted as rolling toward the left of the canvas 320 and the user tilts the tablet 100 toward the right, the controller 120, based on its physics model for the rolling ball drawing tool 330, may generate output signals which cause the display device 130 to depict the rolling ball drawing tool 330 as still moving toward the left but decelerating or slowing its rate at which its moving toward the left. If the user continues to tilt the tablet 100 toward the right, the controller 120 may generate output signals which cause the display device 130 to depict the rolling ball drawing tool 330 ceasing its movement toward the left and begin accelerating toward the right of the canvas 320. Thus, the controller 120 may adjust the perceived velocity of the rolling ball drawing tool 330 across the canvas 320. The controller 120 via its physics model may also account for increased simulated pressure upon the canvas 320 with increased momentum of the drawing tool 330 when generating output signals to update the movement of the rolling ball drawing tool 330 across the canvas 320.

Moreover, in some embodiments, the controller 120 may increase and decrease the acceleration of the rolling ball based upon a magnitude of the spatial movement of the tablet 100. For example, if tilted slightly to the left, the controller 120 may slowly accelerate the rolling ball drawing tool 330 toward the left. However, if titled sharply to the left, the controller 120 may quickly accelerate the rolling ball drawing tool 330 toward the left. In this manner, the controller 120 may cause the display device 130 to move the rolling ball drawing tool 330 across the canvas 320 in a manner that mimics the way a real rolling ball might move upon a tilting surface.

At block 450, the controller 120 may further update the canvas 320 per the simulated movement of the drawing tool across the canvas 320. For example, the controller 120 may generate output signals which cause the display device 130 to update the canvas 320 with a line of color along the path 350 that the rolling ball drawing tool 330 moved across the canvas 320. The controller 120 may further vary the line width along the path 350 to reflect variance in a simulated pressure applied by the rolling ball drawing tool 330 on the canvas 320 as the rolling ball drawing tool 330 traverses the canvas 320. In this manner, a user may create and/or edit an image via spatial movements of the tablet 100 itself.

Various embodiments of the invention are described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a computer readable storage medium such as, for example, flash memory devices, hard disk devices, compact disc media, DVD media, EEPROMs, etc. Such instruction when executed by a electronic tablet device or other computing device, may enable the creation and/or editing of images via spatial movement (e.g., up, down, left, right, tilting, shaking, etc.) of the computing device itself.

One skilled in the art would readily appreciate that many modifications and variations of the disclosed embodiments are possible in light of the above teachings. Thus, it is to be understood that, within the scope of the appended claims, aspects of the disclosed embodiments may be practiced in a manner other than as described above.

What is claimed is:

1. A method for creating and/or editing an image on a canvas presented by a display of an electronic toy, comprising:
   presenting the canvas on the display of the electronic toy in response to the electronic toy executing an image creation and/or editing program of the electronic toy;
   receiving, from a motion sensor of the electronic toy, an input signal indicative of a spatial movement of the electronic toy;
   moving a drawing tool on the display of the electronic toy based on the spatial movement of the electronic toy as indicated by the input signal; and
   updating the image on the canvas presented by the display to reflect an effect of moving the drawing tool across the canvas per the spatial movement of the electronic toy, wherein said updating simulates drawing upon the canvas with the drawing tool as the drawing tool moves across the canvas, wherein
   said moving a drawing tool comprises moving an image of a ball representing the drawing tool across the canvas to simulate the ball rolling across the canvas;
   said updating a canvas comprises updating one or more pixels corresponding to an area of the canvas over which the ball rolled in order to reflect a path of the rolling ball across the canvas; and
   wherein said updating one or more pixels further includes varying a width of the drawn path based on a simulated pressure of the rolling ball drawing tool against the canvas.

2. The method of claim 1, comprising:
   determining, from the input signal, a direction in which the electronic toy is tilted; and
   moving the drawing tool in the determined direction.

3. The method of claim 1, comprising:
   determining, from the input signal, a direction and magnitude in which the electronic toy is tilted; and
   updating a velocity of the drawing tool based on the determined direction and magnitude and a current momentum of the drawing tool.

4. The method of claim 1, wherein said updating comprises updating one or more pixels corresponding to an area of the canvas over which the drawing tool is moved in order to reflect a drawn mark on the canvas that corresponds to a path of the drawing tool over the canvas.

5. The method of claim 1, further comprising selecting the drawing tool by dragging an image of a ball representing the drawing tool over the canvas and dropping the image of the ball on a desired start location of the canvas, wherein:
   said moving a drawing tool comprises moving the image of a ball representing the drawing tool to simulate rolling of the ball across the canvas from the desired start location; and
   said updating a canvas comprises updating one or more pixels corresponding to an area of the canvas over which the ball rolled in order to reflect a path of the rolling ball across the canvas from the desired start location.

6. The method of claim 5, further comprising generating an audio signal that results in a speaker of the electronic toy generating music for the rolling ball.

7. An electronic toy apparatus, comprising:
   a storage device comprising an image creation and editing program;
   a display configured to display, based on one or more output signals, a canvas and a rolling ball drawing tool configured to draw an image on the canvas;
   a motion sensor configured to generate one or more input signals indicative of a spatial movement of the electronic toy apparatus; and
   a controller configured to receive the one or more input signals and to generate one or more output signals, based on execution of the image creation and editing program, that:
      move the rolling ball drawing tool across the canvas based on the spatial movement indicated by the input signal;
      simulate drawing upon the canvas with the rolling ball drawing tool as the rolling ball drawing tool moves across the canvas by updating the canvas to reflect a drawn path of the rolling ball drawing tool rolling across the canvas per the spatial movement; and
      vary a width of the drawn path based on a simulated pressure of the rolling ball against the canvas.

8. The electronic toy apparatus of claim 7, wherein the controller is further configured to determine, based on the one or more input signals, a direction in which the electronic toy apparatus is tilted, and generate the one or more output signals to reflect movement of the rolling ball drawing tool in the determined direction.

9. The electronic toy apparatus of claim 7, wherein the controller is further configured to determine, from the one or more input signals, a direction and a magnitude in which the electronic toy apparatus is tilted, update a velocity of the rolling ball drawing tool based on the determined direction and magnitude, and generate the one or more output signal to reflect the updated velocity of the rolling ball drawing tool.

10. The electronic toy apparatus of claim 9, wherein the controller is further configured to account for a current momentum of the rolling ball drawing tool when updating the velocity of the rolling ball drawing tool.

11. The electronic toy apparatus of claim 9, further comprising a touch sensor overlaying the display, wherein the controller is further configured to:
   receive one or more signals from the touch sensor that select the rolling ball drawing tool, drag the rolling ball drawing tool over the canvas to a desired start location; and drop the drawing tool on the desired start location of the canvas; and
   generate the one or more output signals to mark a path of the rolling ball drawing tool rolling over the canvas from the desired start location.

12. The electronic toy apparatus of claim 9, further comprising one or more speakers, wherein the controller is further configured to provide the one or more speakers with an audio signal that results in the one or more speakers generating music for the rolling ball drawing tool.

13. A non-transitory computer readable storage medium, comprising a plurality of instructions, that in response to being executed, cause an electronic toy tablet device to:
   display a canvas on a display of the electronic toy tablet device;
   drag and drop a rolling ball drawing tool to a desired start location of the canvas based on input signals received from a touch sensor overlaying the display of the electronic toy tablet device;
   detect a spatial movement of the electronic toy tablet device;
   move the rolling ball drawing tool across the canvas from the desired start location based on the detected spatial movement of the electronic toy tablet device;

simulate drawing upon the canvas with the rolling ball drawing tool as the rolling ball drawing tool moves across the canvas by updating the image on the canvas to reflect a drawn path of the rolling ball drawing tool rolling across the canvas from the desired start location per the detected spatial movement; and vary a width of the drawn path based on a simulated pressure of the rolling ball drawing tool against the canvas.

14. The non-transitory computer readable storage medium of claim 13, wherein the plurality of instructions further cause the electronic toy tablet device to:

determine a direction in which the electronic toy tablet device is tilted; and move the rolling ball drawing tool in the determined direction.

15. The non-transitory computer readable storage medium of claim 13, wherein the plurality of instructions further cause the electronic tablet device to:

determine a direction and a magnitude in which the electronic toy tablet device is tilted; and update movement of the rolling ball drawing tool based on a physics model of the rolling ball drawing tool.

16. The non-transitory computer readable storage medium of claim 13, wherein the plurality of instructions further cause the electronic toy tablet device to generate an audio signal that results in a speaker of the electronic toy tablet device generating music for the selected drawing tool.

* * * * *